(12) United States Patent
Soh

(10) Patent No.: US 8,120,647 B2
(45) Date of Patent: Feb. 21, 2012

(54) 3-DIMENSIONAL DISPLAY DEVICE HAVING DIVIDED REGIONS

(75) Inventor: Jae-Hyun Soh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1271 days.

(21) Appl. No.: 11/819,956

(22) Filed: Jun. 29, 2007

(65) Prior Publication Data
US 2008/0007661 A1  Jan. 10, 2008

(30) Foreign Application Priority Data

Jun. 30, 2006  (KR) .................. 10-2006-0061611

(51) Int. Cl.
H04N 13/00 (2006.01)
H04N 13/04 (2006.01)
H04N 3/14 (2006.01)

(52) U.S. Cl. ............... 348/51; 348/42; 348/58; 348/790

(58) Field of Classification Search .................. 348/42, 348/51, 55, 56, 57, 58, 790
See application file for complete search history.

(56) References Cited

U.S. PATENT DOCUMENTS

| | | | | |
|---|---|---|---|---|
| 5,920,363 A * | 7/1999 | Rofe | ............ | 349/96 |
| 6,052,163 A * | 4/2000 | Sung | ............ | 349/42 |
| 6,437,915 B2 * | 8/2002 | Moseley et al. | ............ | 359/465 |
| 2004/0109115 A1 * | 6/2004 | Tsai et al. | ............ | 349/117 |
| 2004/0227889 A1 * | 11/2004 | Kim | ............ | 349/139 |
| 2005/0134762 A1 * | 6/2005 | Sung et al. | ............ | 349/96 |
| 2006/0097971 A1 * | 5/2006 | Lee et al. | ............ | 345/89 |
| 2006/0139448 A1 * | 6/2006 | Ha et al. | ............ | 348/51 |
| 2006/0164862 A1 * | 7/2006 | Chien et al. | ............ | 362/619 |

* cited by examiner

Primary Examiner — Larry Donaghue
Assistant Examiner — Brian J Gillis
(74) Attorney, Agent, or Firm — McKenna Long & Aldridge, LLP

(57) ABSTRACT

3-dimensional display device includes a display panel for displaying image; a backlight for supplying light to the display panel; and a switching liquid crystal panel between the display panel and the backlight to display 2-dimensional image and 3-dimensional image by blocking and transmitting the light from the backlight in part area, the switching liquid crystal panel being divided a plurality of regions to display respectively the 2-dimensional image and the 3-dimensional image in each regions.

8 Claims, 4 Drawing Sheets

3-DIMENSIONAL DISPLAY DEVICE HAVING DIVIDED REGIONS

This application claims the benefit of Korean Patent Application No. 10-2006-61611, filed on Jun. 30, 2006, which is hereby incorporated by reference for all purposes as if fully set forth herein.

BACKGROUND OF THE INVENTION

1. Field of the Invention

The present invention relates to a 3-dimensional display device, and more particular to the 3-dimensional display device capable of displaying synchronously 2-dimensional and 3-dimensional images in a plurality of regions.

2. Discussion of the Related Art

Due to the high speed telecommunication network, telecommunication equipment has been developed to a digital terminal which is used for a multi-media service such as text message service, voice service, and image service as well as telephone. This telecommunication equipment may be developed to the 3-dimensional (dimensional) real telecommunication service.

A 3-dimensional image is realized by the principle of stereo-sight in two eyes. Since the two eyes of a human are apart from each other at 65 mm, the binocular parallax is the most important thing in the 3-dimensional image. When the left eye and the right eye see respectively different 2-dimensional images, each 2-dimensional is transmitted to the brain through a retina, and the brain combines the two 2-dimensional images to recognize the 3-dimensional image.

This function is called as stereography. There some methods for 3-dimensional image using the 2-dimensional, for example, the 3-dimensional image method using an anaglyphoscope, the 3-dimensional image method without anaglyphoscope, and a holographic method.

Of these methods, there are some problems in the 3-dimensional image method using an anaglyphoscope and the the holographic method. That is, in the 3-dimensional image method using an anaglyphoscope, for many people to see the 3-dimensional image at the same time, they must put on the anaglyphoscope glasses. In the holographic method, although users may see the 3-dimensional image at all the directions, there are some technical problems and the space required for holographic system may be increased.

There are not these problems in the 3-dimensional image method without anaglyphoscope and thus this method has been adapted to the 3-dimensional display device. Specially, the parallax 3-dimensional image method that the stereo images for the right eye and the left eye are separated to see the 3-dimensional image is mainly used.

In the parallax method, the image having image information for the right and left eyes is superposed with the slits arranged in the horizontal direction is superposed to separate the composed 3-dimensional image into the right image and the left image. By this separation, the user is able to see the 3-dimensional image. In this method, the display device should include the display panel for display image and a parallax barrier having slits.

Hereinafter, we will describe the related parallax 3-dimensional display device accompanying FIG. 1. At that time, the liquid crystal display panel is described as the main display panel.

As shown in FIG. 1, the liquid crystal display panel 10 includes a plurality of left eye pixels L and right eye pixels R arranged alternatively each other. A backlight 20 is disposed in the rear of the liquid crystal display panel 10 to supply the light to the liquid crystal display panel 10. The parallax barrier 30 is disposed between the liquid crystal display panel 10 and the viewer 40 to transmit or intercept the light transmitting the liquid crystal display panel 10. In the parallax barrier 30, a plurality of slits 32 and barriers 34 are alternatively formed in the stripe shape to transmit and intercept respectively the light from the left eye pixels L and the right eye pixels R.

In the related display device, the light L1 transmitting the left eye pixels L of the liquid crystal display panel 10 from the backlight 20 is reached to the left eye of the viewer 40 through the slits 32 of the parallax barrier 30, while the light L2 transmitting the left eye pixels L of the liquid crystal display panel 10 and to be reached to the right eye of the viewer 40 is intercepted by the barrier 34 of the parallax barrier 30.

Further, the light R1 transmitting the right eye pixels R of the liquid crystal display panel 10 from the backlight 20 is reached to the right eye of the viewer 40 through the slits 32 of the parallax barrier 30, while the light R2 transmitting the right eye pixels R of the liquid crystal display panel 10 and to be reached to the left eye of the viewer 40 is intercepted by the barrier 34 of the parallax barrier 30.

Accordingly, the light L1 and R2 transmitting the left eye pixels L and the right eye pixels R is respectively reached to only the left eye and the right eye of the viewer 40. Since there is the sufficient parallax information between the light L1 and R2 transmitting the left eye pixels L and the right eye pixels R, the viewer 40 can perceive the parallax between the light L1 and R2 transmitting the left eye pixels L and the right eye pixels R and thus see the 3-dimensional images.

However, there is a problem in the related parallax 3-dimensional display device as follow.

When the user sees the 3-dimensional image, in general, it is also necessary to display 2-dimensional image. For example, if texts or information are displayed in 3-dimensional image on screen, it is difficult to read these text and information.

SUMMARY OF THE INVENTION

An object of the present invention is to provide 3-dimensional display device having a switching liquid crystal panel to display both 2 and 3-dimensional images.

Other object of the present invention is to provide the 3-dimensional display device in which information such as a text is displayed in 2-dimensional mode and the image is displayed in 3-dimensional mode.

In order to achieve the object, the 3-dimensional display device according to the present invention includes a display panel for displaying image; a backlight for supplying light to the display panel; and a switching liquid crystal panel between the display panel and the backlight to display 2-dimensional image and 3-dimensional image by blocking and transmitting the light from the backlight in part area, the switching liquid crystal panel being divided a plurality of regions to display respectively the 2-dimensional image and the 3-dimensional image in each regions.

The display panel includes a plurality of left eye pixels and right eye pixels to be alternatively disposed each other. The switching liquid crystal panel includes first and second substrate, a liquid crystal layer between the first and second substrate, and a first electrode on a part of the first substrate and a second electrode on the second substrate to apply the voltage to the liquid crystal layer. Since the first electrode is declined with a side of the substrate, the first electrode at the boundary area of the regions is divided and a second signal line is connected the divided first electrode at the boundary area.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be given in detail to an embodiment of the present invention, examples of which are illustrated in the accompanying drawings.

The embodiment provides the 3-dimensional display device in which both 2-dimensional image and 3-dimensional image can be displayed. In particular, in this embodiment, the screen is divided into a plurality of regions to display the 2-dimensional image and the 3-dimensional image in each region.

To display the 2-dimensional image and the 3-dimensional image in each region, the 3-dimensional display device has a different structure from that of the related 3-dimensional display device. That is, in this embodiment, the light is transmitted and blocked in each region according to the signal to display the 2-dimensional image and the 3-dimensional image in corresponding regions.

Hereinafter, the 3-dimensional display device according to the embodiment will be described in detail accompanying drawings. In the description, we will describe the liquid crystal display panel as a display panel. However, various display panels may be adapted to this invention.

Figure 1:
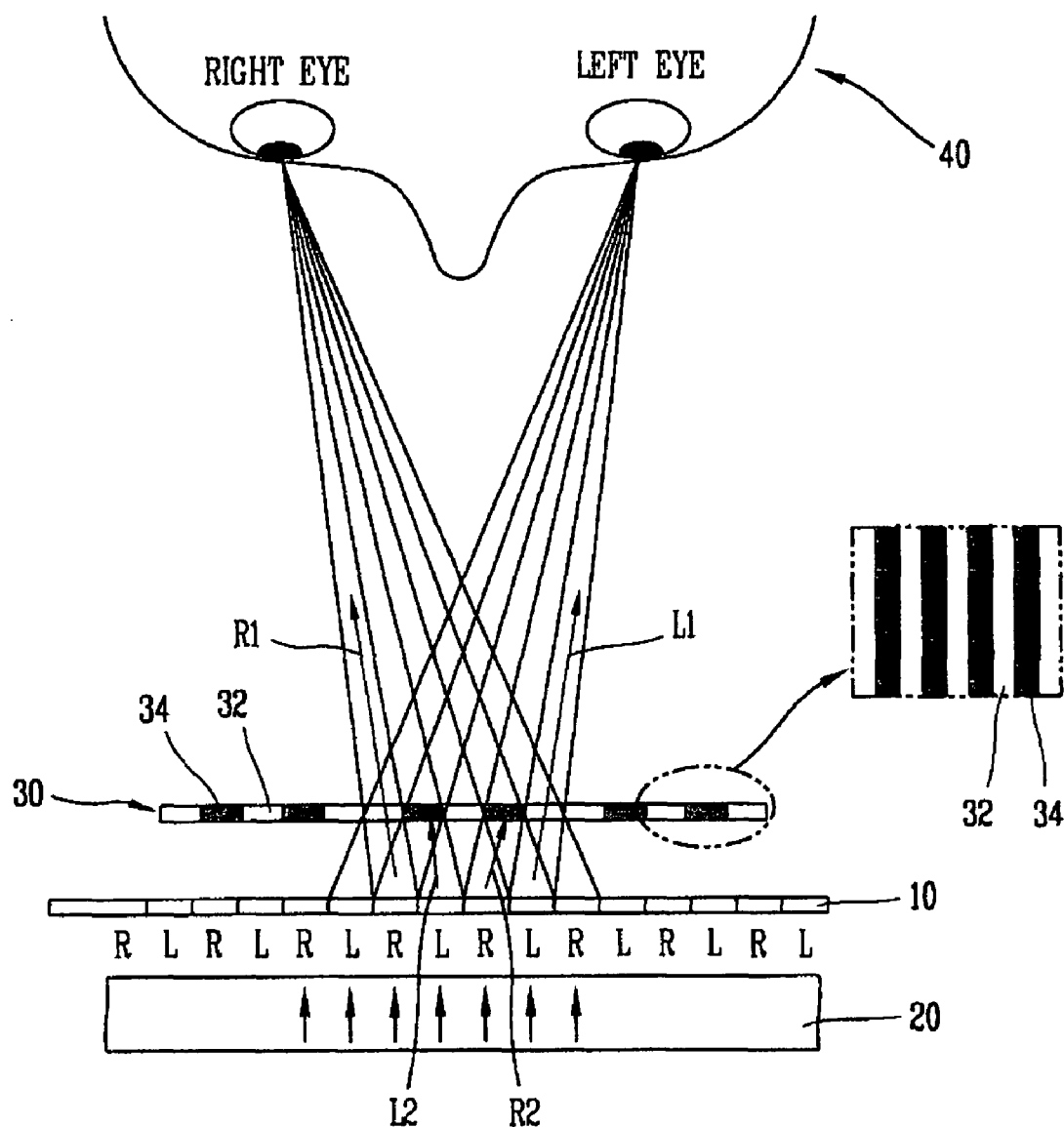
FIG. 1 is a view showing related parallax 3-dimensional display device.
Figure 2A:
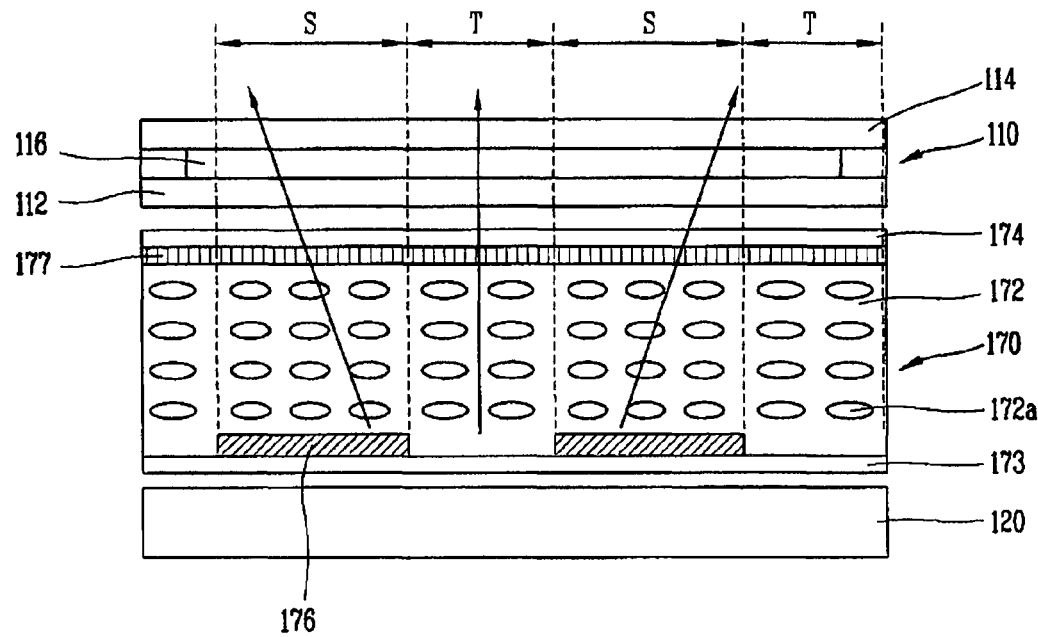
FIGS. 2A and 2B are views showing the 3-dimensional display device according to an embodiment of the present invention.
Figure 2B:
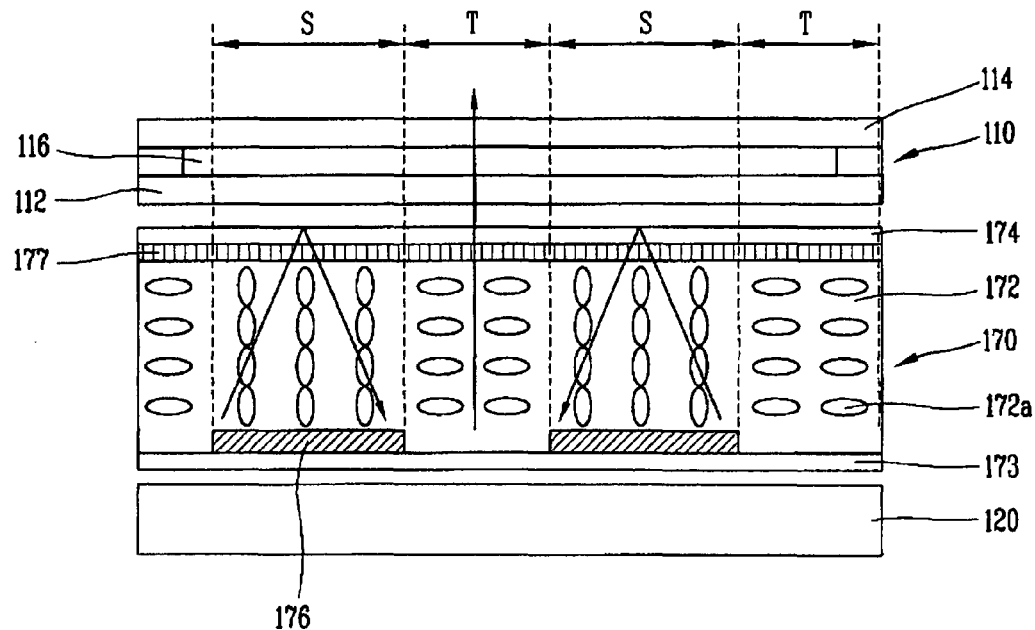

FIGS. 2A and 2B are views indicating the 3-dimensional display device according to an embodiment of this invention.

As shown in FIGS. 2A and 2B, the 3-dimensional display device includes a liquid crystal display panel 110, a backlight 120 for supplying the light to the liquid crystal display panel 110, a switching liquid crystal panel 170 for transmitting or blocking the light from the backlight 120 to function as a parallax barrier, a light scattering control unit 180 in the rear side of the switching liquid crystal panel 170 to control the scattering of the light incident into the switching liquid crystal panel 170, and a light control film 160 between the light scattering control unit 180 and the backlight 120 to reflect and focus the light incident to the light scattering control unit 180 in order to improve the efficiency of the light.

Not shown in figures, a plurality of left eye pixels for displaying the image information for the left eye and right eye pixels for displaying the image information for the right eye may be alternately arranged. At this time, the left eye pixels and the right eye pixels are defined by a plurality of gate lines and data lines on a first substrate 112 which are disposed in the perpendicular direction each other to apply respectively the scan signal and the image signal to the left eye pixels and the right eye pixels. In each left eye pixels and the right eye pixels, further, a thin film transistor is disposed. The thin film transistor is turned on when the scan signal is applied through the gate line, so that the image signals for the left eye and the right eye are respectively supplied to the left eye pixels and the right eye pixels to display the images for the left eye and the right eye.

A black matrix (not shown) for blocking the light transmitting through the non-displaying region and a color filter (not shown) for representing the colors may be formed on a second substrate 114, and a liquid crystal layer 116 may be formed between the first and second substrates.

Not shown in figure, the backlight 120 may include at least one lamp for emitting the light, an optical sheet for improving the efficiency of the light, and a reflecting plate for reflecting the light to the liquid crystal display panel 110.

Further, the switching liquid crystal panel 170 includes substrates 173 and 174, a liquid crystal layer 172 between the substrates 173 and 174, a first electrode 176 in the predetermined region on the lower substrate 173, and a second substrate 177 in the whole area of the upper substrate 174.

The first and second electrodes 176 and 177 may be made of a transparent conductive material such as an indium tin oxide and an indium zinc oxide. When the voltage is applied to the first and second electrodes 176 and 177, the electric field is applied between the first and second electrode 176a and 176b to arrange the liquid crystal molecules 172a of the liquid crystal layer 172 along the direction of the electric field in the region corresponding to the first electrode 176.

The operation of the 3-dimensional display device according this embodiment will describe in detail as follow.

As shown in FIG. 2A, in the 2-dimensional display mode, the signal, that is, the voltage is not applied to the first and second electrodes 176 and 177 so that the liquid crystal molecules 172a are arranged in the same direction in the whole area of the liquid crystal layer 172. Thus, the light is uniformly transmitted in the whole area of the switching liquid crystal panel 170 and then incident to the liquid crystal display panel 110. As a result, the light transmitting the left and right eye pixels reaches to both the left and right eyes of the reviewer to perceive the 2-dimensional image.

As shown in FIG. 2B, in 3-dimensional display mode, the voltage is applied to the first electrode 176 and the second electrode 177. By applying the voltage to the electrodes 176 and 177, the electric field is formed in the liquid crystal layer 172 of the switching liquid crystal panel 170 to arrange the liquid crystal molecules 172a along the electric field. At that time, since the electric field is formed at only the region corresponding to the first electrode 176 in the liquid crystal layer 172, the liquid crystal molecules 172a in the region corresponding to the first electrode 176 are arranged along the electric field and the liquid crystal molecules in other region maintains in the original arrangement.

As described above, in this embodiment, when the light from the backlight 120 is inputted to the switching liquid crystal panel 170 to which the voltage is applied, the liquid crystal molecules 172a are arrange in the direction perpendicular to the surface of the substrate 173 and 174 along the electric field by the birefringence of the liquid crystal molecule so that the light is passing the region (i.e., the transmitting regions T) where the electric field is not formed, not the region where the electric field is formed (i.e., the blocking regions S corresponding to the first electrode 176).

In 3-dimensional display mode, when the voltage is applied to the switching liquid crystal panel 170, the light transmitting the transmitting region T of the switching liquid crystal panel 170 from the backlight 120 is transmitting the left eye pixels of the liquid crystal display panel 110 and then reaches to the left eye of the viewer. However, the light transmitting the left eye pixels of the liquid crystal display panel 110 and to be reached to the right eye of the viewer is blocked by the blocking region S of the switching liquid crystal panel 170 (i.e., region where the liquid crystal molecules are switched). That is, the light transmitting the left eye pixels of the liquid crystal display panel 110 does not reached to the right eye of the viewer.

Further, when the voltage is applied to the switching liquid crystal panel 170, the light transmitting the transmitting region T of the switching liquid crystal panel 170 from the backlight 120 is transmitting the right eye pixels of the liquid crystal display panel 110 and then reaches to the right eye of the viewer. However, the light transmitting the right eye pixels of the liquid crystal display panel 110 and to be reached to the left eye of the viewer is blocked by the blocking region S of the light control film 160. That is, the light transmitting the right eye pixels of the liquid crystal display panel 110 does not reached to the left eye of the viewer.

As shown above, the light transmitting the right eye pixels reaches to only the right eye of the viewer and the light transmitting the left eye pixels reaches to only the left eye of the viewer. In these lights there is the sufficient parallax to be perceived by the viewer so that the viewer can perceive the 3-dimensional image.

Further, since the light is blocked and transmitted by applying the voltage to the switching liquid crystal panel 170, the display device may be used as both 2 and 3-dimensional display devices. In addition, the switching liquid crystal panel 170 and the electrodes therein are divided into a plurality of regions to display the 2-dimensional image and the 3-dimensional image in each region by applying the signal to the electrode in each region.

Figure 3A:
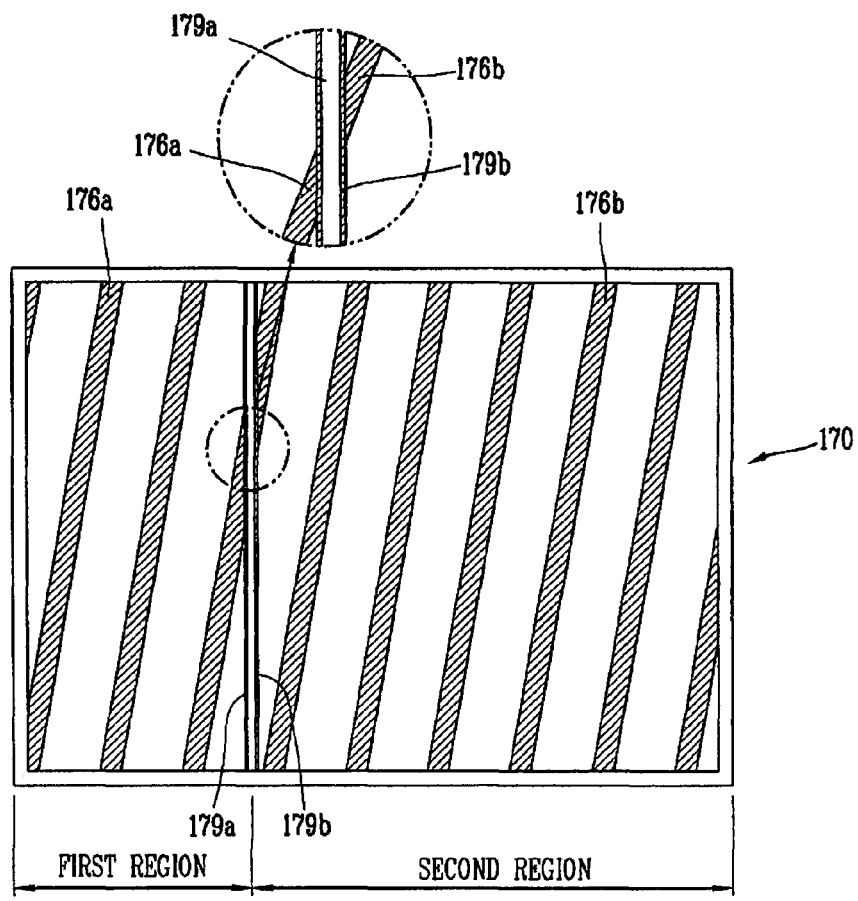
FIGS. 3A-3C are views showing a switching liquid crystal panel divided into a plurality of regions according to an embodiment of the present invention.
Figure 3B:
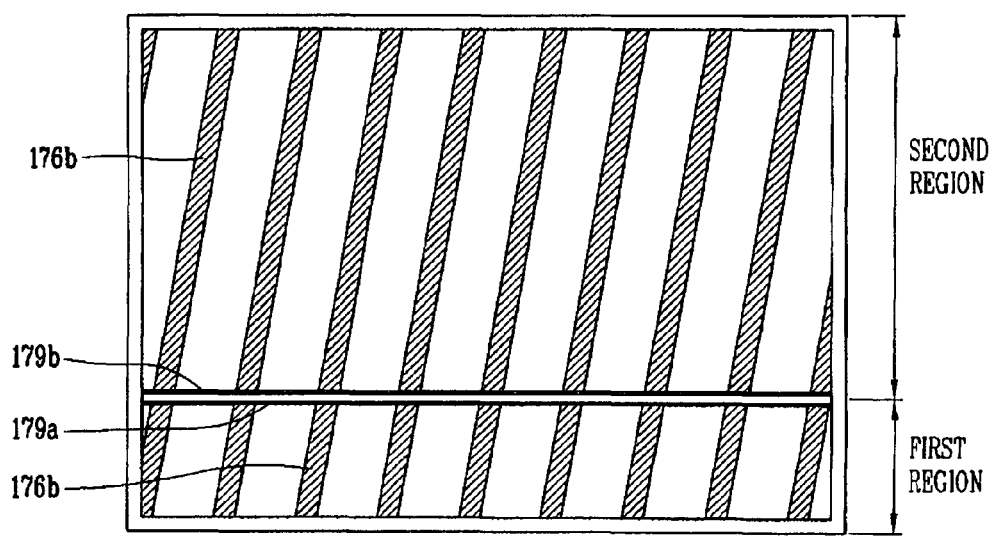
Figure 3C:
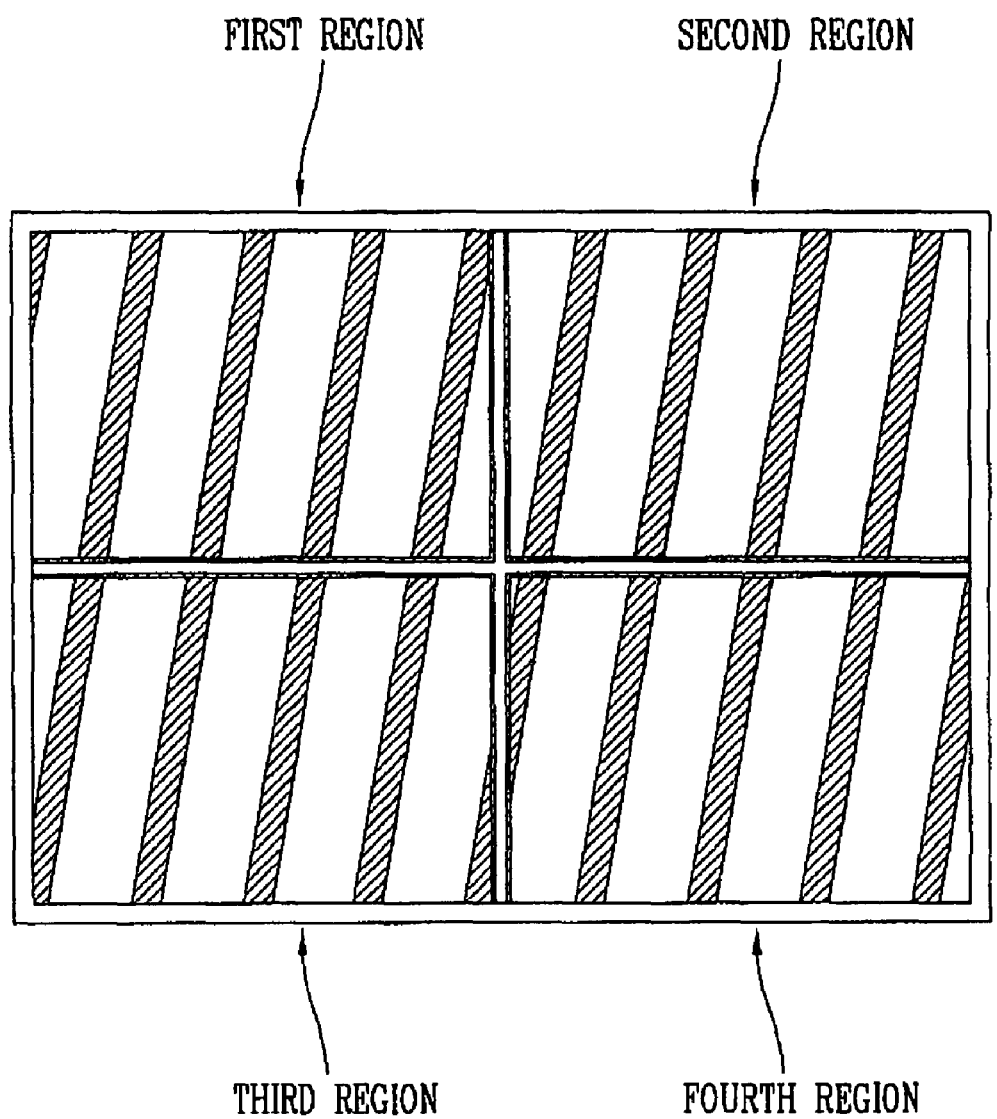

FIGS. 3A-3C are views of the 3-dimensional display device having divided screens. Although the 3-dimensional display device includes the structure shown in FIG. 2, only the first electrode 176 of the switching liquid crystal panel is indicated in FIGS. 3A-3C for convenience of the description (Since the second electrode is formed in the whole area of the switching liquid crystal panel 170, it is not necessary to draw the second electrode in figures).

As shown in FIG. 3A, a plurality of first electrodes 176 are disposed in the whole area of the switching liquid crystal panel 170 in the predetermined distance to define the blocking region S and the transmitting region T. The first electrode 176 is perpendicular to the one side of the switching liquid crystal panel 170 or declined at the certain angle thereto. Not shown in figures, the conductive line is connected to the first electrode 176 to be supplied the signal from the outer driver and the liquid crystal molecules 172 in the region corresponding to the first electrode 176 are switched to block the light trough the switching liquid crystal panel 170.

The switching liquid crystal panel 170 includes a first region and a second region. The signal is applied to the first electrode 176b of the second region, not the first electrode 176a of the first region. Thus, the liquid crystal molecules are arranged in the same direction in the first region to transmit the light through the whole area of the first region in order to display 2-dimensional image in the first region, while the liquid crystal molecules of the blocking region S are arranged along the electric field in the second region to display 3-dimensional image. At this time, it is possible to display respectively 2-dimensional image and the 3-dimensional image in the second region and the first region by applying the signal to the electrode 176a, not the electrode 176b.

As shown in FIG. 3A, since the first electrodes 176a and 176b are declined at certain angle, the first electrode at the boundary area of the first region and the second region is belonged to both first region and the second region. In order to display respectively the 2-dimensional image and the 3-dimensional image in the first region and the second region, therefore, the first electrode at the boundary area should be separated. As shown in a partially enlarged view of FIG. 3A, the first electrodes 176a and 176b at the boundary area of the first region and the second region are separated in the predetermined distance and the first electrodes 176a of the first region and the first electrode 176b of the second region are respectively connected to the signal lines 179a and 179b. Thus, the different signals are respectively applied to the first electrodes 176a and 176b to display the 2-dimensional image and the 3-dimensional image in each region.

In this invention, the switching liquid crystal panel may be divided into various shapes. That is, the switching liquid crystal panel may be divided into two regions in the lower and upper direction as shown in FIG. 3B and divided into more than 4 regions. In these structures, the first electrodes in each regions is separated each other to apply the separate signal to the first electrode of each regions.

As described above, the 2-dimensional image and the 3-dimensional image can be synchronously displayed in a plurality of regions. Thus, while the viewer sees the image in the 3-dimensional display mode, the viewer can also see the information for image such as the text in the 2-dimensional display mode.

Although the 3-dimensional display device is disclosed in FIGS. 2A and 2B, the 3-dimensional display device is not limited to this structure. This device may include the display device having various structures in which the screen may be divided into a plurality of regions to display respectively the 2-dimensional image and 3-dimensional image.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A 3-dimensional display device comprising:
a display panel for displaying an image;
a backlight for supplying light to the display panel; and
a switching liquid crystal panel between the display panel and the backlight to display 2-dimensional image and 3-dimensional image by blocking and transmitting the light from the backlight in part area, the switching liquid crystal panel being divided a plurality of regions to display respectively the 2-dimensional image and the 3-dimensional image in each regions, the switching liquid crystal panel including:
first and second substrates;
a liquid crystal layer between the first and second substrates; and
first electrode on a part of the first substrate and a second electrode on the second substrate to apply voltage to the liquid crystal layer,
wherein the display panel is divided into a 2-dimensional region for displaying 2-dimensional image and a 3-dimensional region for displaying 3-dimensional image, the first electrode being declined with a side of the first and second substrates, the first electrode at a boundary of the 2-dimensional region and the 3-dimensional region being divided at the boundary of the 3-dimensional region and the end portion of the first electrode being facing for each other at the boundary of the 2-dimensional region and the 3-dimensional region so that different signals are respectively supplied to the divided first electrode.

2. The device of claim 1, wherein the display panel includes a liquid crystal display panel.

3. The device of claim 1, wherein the display panel a plurality of left eye pixels and right eye pixels alternatively arranged.

4. The device of claim 1, wherein the back light includes:
a lamp for emitting the light; and
a reflecting plate for reflecting the light from the lamp to the display panel.

5. The device of claim 1, wherein the switching liquid crystal panel further includes:

a first signal line for applying a signal to the first electrode.

6. The device of claim 1, wherein all of liquid crystal molecules are arranged in an uniform direction to transmit uniformly the light when the voltage is not applied to the first and second electrodes.

7. The device of claim 1, wherein liquid crystal molecules in region where an electric field is formed are switched by the electric field to block the light to the region when the voltage is applied to the first and second electrodes.

8. The device of claim 1, wherein the switching liquid crystal panel further includes a second signal line connected to the divided first electrode at the boundary area of the regions.

* * * * *